(12) United States Patent
Righetti

(10) Patent No.: US 11,021,137 B2
(45) Date of Patent: Jun. 1, 2021

(54) THREE-STAGE PARKING JACK

(71) Applicant: SIMOL S.P.A., Luzzara (IT)

(72) Inventor: Valter Righetti, San Benedetto Po (IT)

(73) Assignee: SIMOL S.P.A., Luzzara (IT)

( * ) Notice: Subject to any disclaimer, the term of this patent is extended or adjusted under 35 U.S.C. 154(b) by 288 days.

(21) Appl. No.: 16/182,822

(22) Filed: Nov. 7, 2018

(65) Prior Publication Data

US 2019/0135243 A1    May 9, 2019

(30) Foreign Application Priority Data

Nov. 8, 2017   (IT) ........................ 102017000127261

(51) Int. Cl.
| | | |
|---|---|---|
| *B66F 3/00* | (2006.01) | |
| *B60S 9/08* | (2006.01) | |
| *B66F 3/16* | (2006.01) | |

(52) U.S. Cl.
CPC . *B60S 9/08* (2013.01); *B66F 3/16* (2013.01)

(58) Field of Classification Search
CPC ...... B66F 3/00; B66F 3/10; B66F 3/12; B66F 3/16; B66F 3/30; B66F 5/00; B60S 9/00; B60S 9/08; B60S 9/12; B60S 9/20; B60S 11/00
See application file for complete search history.

(56) References Cited

U.S. PATENT DOCUMENTS

| | | | | |
|---|---|---|---|---|
| 4,796,864 | A  * | 1/1989 | Wilson ..................... | B60S 9/08 |
| | | | | 254/103 |
| 6,764,065 | B2 * | 7/2004 | Fox .......................... | B60S 9/02 |
| | | | | 254/103 |
| 6,895,648 | B1 | 5/2005 | Willett | |
| 2008/0099745 | A1 | 5/2008 | Arzouman | |
| 2012/0091411 | A1* | 4/2012 | Hansen ..................... | B60S 9/12 |
| | | | | 254/93 R |
| 2019/0135243 | A1* | 5/2019 | Righetti .................... | B66F 3/16 |

* cited by examiner

*Primary Examiner* — Lee D Wilson
(74) *Attorney, Agent, or Firm* — Browdy and Neimark, PLLC

(57) ABSTRACT

A jack (1), which is extensible, comprising: a first tubular body (5), a second tubular body (30) slidably associated with the first tubular body (5) and movable along a predetermined longitudinal direction (A), a third tubular body (95) slidably associated with the second tubular body (30) and movable along the longitudinal direction (A), a base (115) for support associated with an end (105) of the third tubular body (95) distal from the second tubular body (30), characterized in that it comprises an automatic safety device (145) provided with a lockbolt (150) movable between a first position, wherein it allows relative sliding between the third tubular body (95) and the second tubular body (30), and a second position wherein it prevents the third tubular body (95) from sliding relative to the second tubular body (30).

11 Claims, 9 Drawing Sheets

THREE-STAGE PARKING JACK

TECHNICAL FIELD

The present invention relates to a jack intended for structures and/or machinery, in particular an extensible three-stage jack.

BACKGROUND ART

Extensible jacks are generally used for lifting and/or leveling structures or machinery such as truck trailers, agricultural machinery or industrial vehicles, in order to allow the same to be firmly resting on the ground.

In particular, jacks of the three-stage type comprise three tubes slidably associated with one another, of which a first tube having a second tube slidably associated therewith and a third tube slidably associated with the second tube. The first tube is resting on the ground due to a support base or wheel, while the third tube is generally fastened to the object to be supported.

Inside the tubes there is provided a first adjusting device of the extension of the jack which varies the distance between the opposite ends of the first tube and the second tube.

A known drawback is that, in the case where such extension adjusting devices include an operative position wherein corresponding tubes are decoupled, the first tube, if not appropriately retained by an operator, tends to slip off by gravity and fall to the ground.

In addition, where the jack is installed on a self-propelled vehicle or on a tool to be towed, it may happen that vibrations due to the movement may cause the extension adjusting device to be displaced, resulting in one tube to become extracted from the other one with consequent loss of the tube during transport.

It is an object of the present invention to overcome the aforementioned drawbacks of the prior art, within a simple, rational and cost-effective solution. Such objects are attained by the features of the invention disclosed in the independent claim.

Dependant claims outline preferred and/or particularly advantageous aspects of the invention.

DISCLOSURE OF THE INVENTION

The invention provides a jack, wich is extensible, comprising: a first tubular body, a second tubular body slidably associated with the first tubular body and movable along a predetermined longitudinal direction, a third tubular body slidably associated with the second tubular body and movable along the longitudinal direction, a support base associated with an end of the third tubular body distal from the second tubular body, characterized in that it comprises an automatic safety device provided with a movable lockbolt between a first position, wherein it allows relative sliding between the third tubular body and the second tubular body, and a second position wherein it prevents the third tubular body from sliding relative to the second tubular body.

Owing to this solution, a jack is made available wherein the third tubular body is prevented from becoming unintentionally extracted from the second tubular body, thereby providing greater safety for the operator and preventing the loss of the third tubular body, for example during transport of the object whereon the jack is installed.

In one aspect the invention provides the safety device as being configured such that the lockbolt, when located in the second position thereof, impedes relative sliding between the third tubular body and the second tubular body only in the direction away from the base from the third tubular body.

In this way the operator is not required to intervene directly on the lockbolt in order that the third tubular body is moved toward the second tubular body when the safety device is in the second position.

In another aspect the invention provides that the safety device may be configured to automatically switch from the first position to the second position when the distance between the base and the second tubular body reaches a preselected value.

In this way the safety device only comes into operation when a preselected distance is reached.

Preferably, the lockbolt comprises a first section and a second section perpendicular to the first section, and wherein the safety device comprises a first slot afforded in a bottom wall of a recess of the third tubular body and with which the first lockbolt section is permanently associated, a second slot afforded in the second tubular body, and an elastic member capable of rotating the lockbolt between the first position and the second position by inserting at least one portion of the second section into the second slot when the distance between the support base and the second tubular body reaches the preselected value.

Owing to this solution, an effective and easy-to-implement safety device is made available.

According to another aspect of the invention, the lockbolt may comprise an interface surface obtained in the second section which interface surface, when the lockbolt is in the second position, is at least partially inserted in the second slot, comes into contact with said second slot and is lying on an inclined plane relative to a perpendicular plane to the longitudinal axis.

In this way the lockbolt, when in the second position thereof, does not oppose the movement of the third tubular body in the direction of approaching the second tubular body.

According to a further aspect of the invention, the lockbolt comprises a first abutting surface capable of contacting at least at one point a surface of the second slot and a second abutting surface capable of contacting at least at one point a surface of the first slot that is facing the surface of the second slot, when the safety device is in the second position.

In this way due to the lockbolt a solid and effective obstruction-based connection is obtained between the third tubular body and the second tubular body, wherein the former is compressed between them when the safety device is in the second position and the tubular bodies are subjected to forces acting in the direction of mutual distancing.

According to another aspect of the invention, the elastic member may exhibit a first end in contact with the bottom wall of the recess and a second end received within a valley afforded in the lockbolt.

Owing to this solution it is possible to keep the elastic member in place effectively and thus facilitating assembly of the safety device.

Advantageously, the jack may comprise a first distance adjusting device between the second tubular body and the first tubular body, said first adjusting device being provided with a nut solidly constrained to the second tubular body and a screw rotatably associated with the first tubular body according to a rotation axis and configured to be screwed or unscrewed relative to said nut.

In this way the jack is allowed to accurately adjust its extension and therefore the height from the ground of the object with which the former is associated.

Further, the jack may comprise a second distance adjusting device between the third tubular body and the second tubular body, said second adjustment device being provided with a hole obtained in the third tubular body, a hole obtained in the second tubular body and a pin adapted to be inserted through the hole of the second tubular body and the hole of the third tubular body when they are aligned. In this way it is possible to change the overall jack length more rapidly compared to a jack provided with only the screw device and the nut.

Another aspect of the invention provides that the support base may comprise a handle.

Owing to this solution the operator may more easily switch the safety device from the second position to the first position by pulling or pushing the third tubular body in the direction of approaching the second tubular body.

BRIEF DESCRIPTION OF DRAWINGS

Further features and advantages of the invention will become apparent from the reading of the following description given by way of non-limiting example, with the aid of the figures illustrated in the attached tables.

BEST WAY TO IMPLEMENT THE INVENTION

Figure 1:
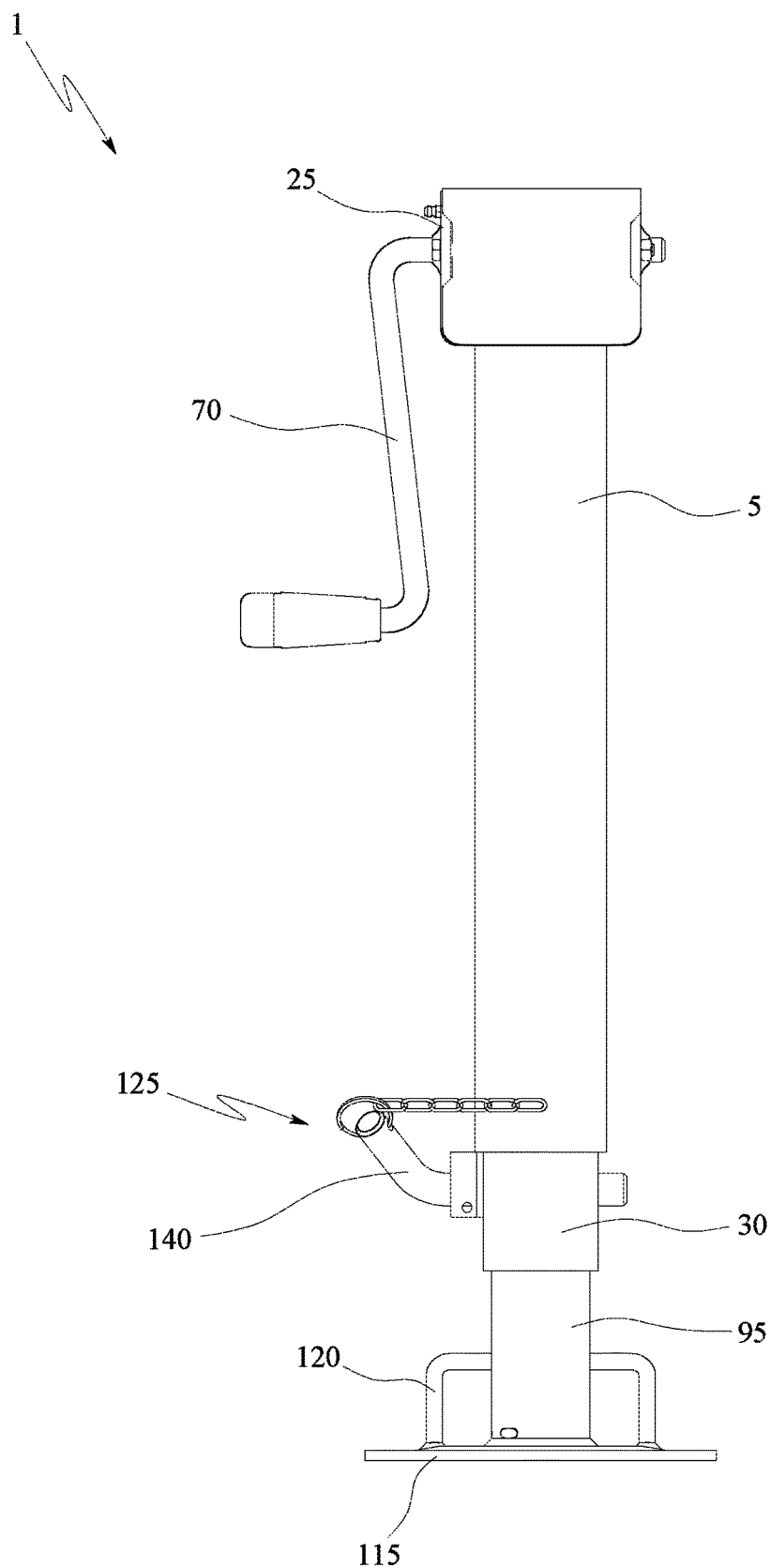
FIG. 1 is a side view of a jack according to the invention.
Figure 2:
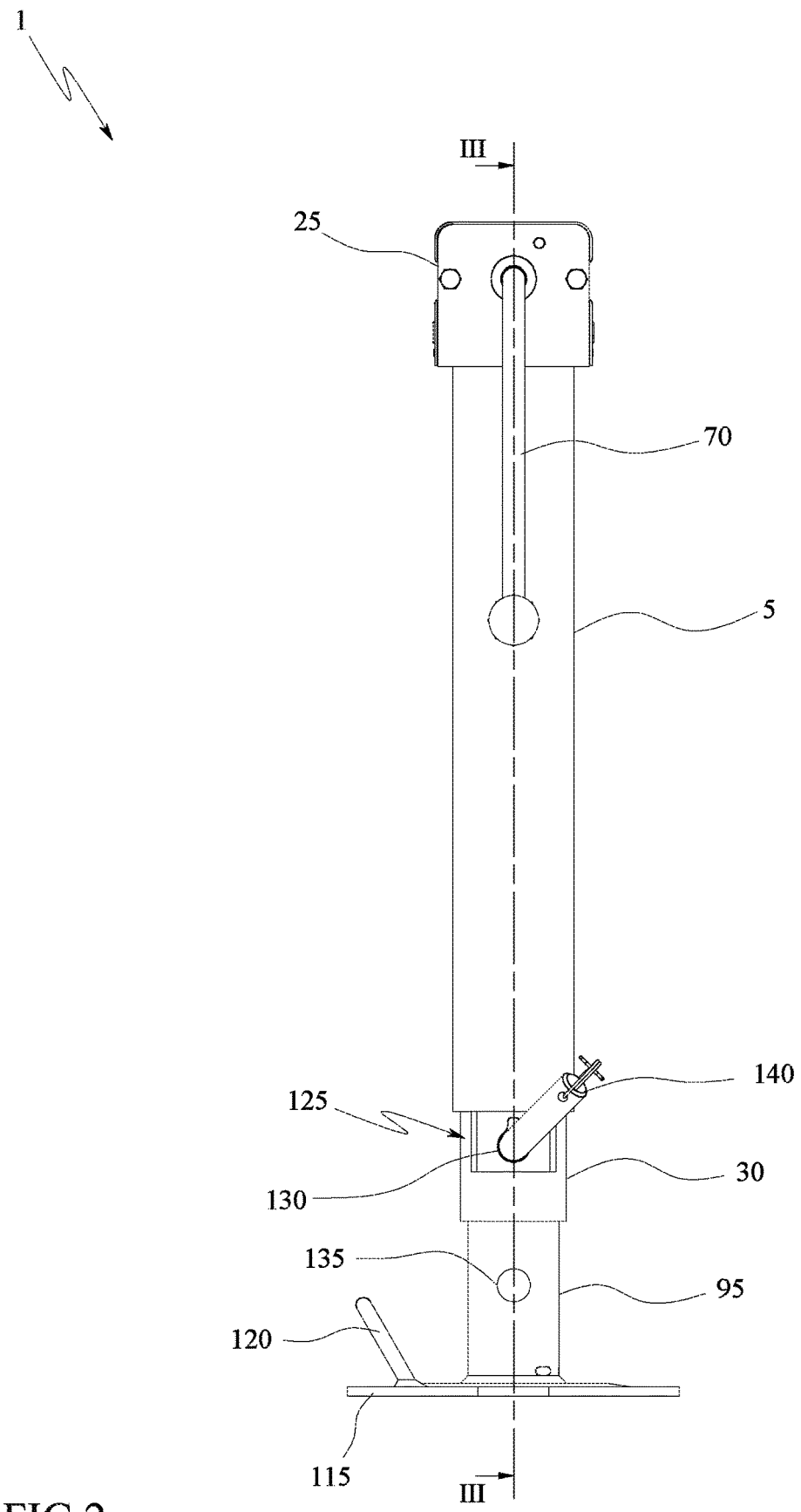
FIG. 2 is a side view of the jack rotated by 90° relative to FIG. 1.
Figure 3:
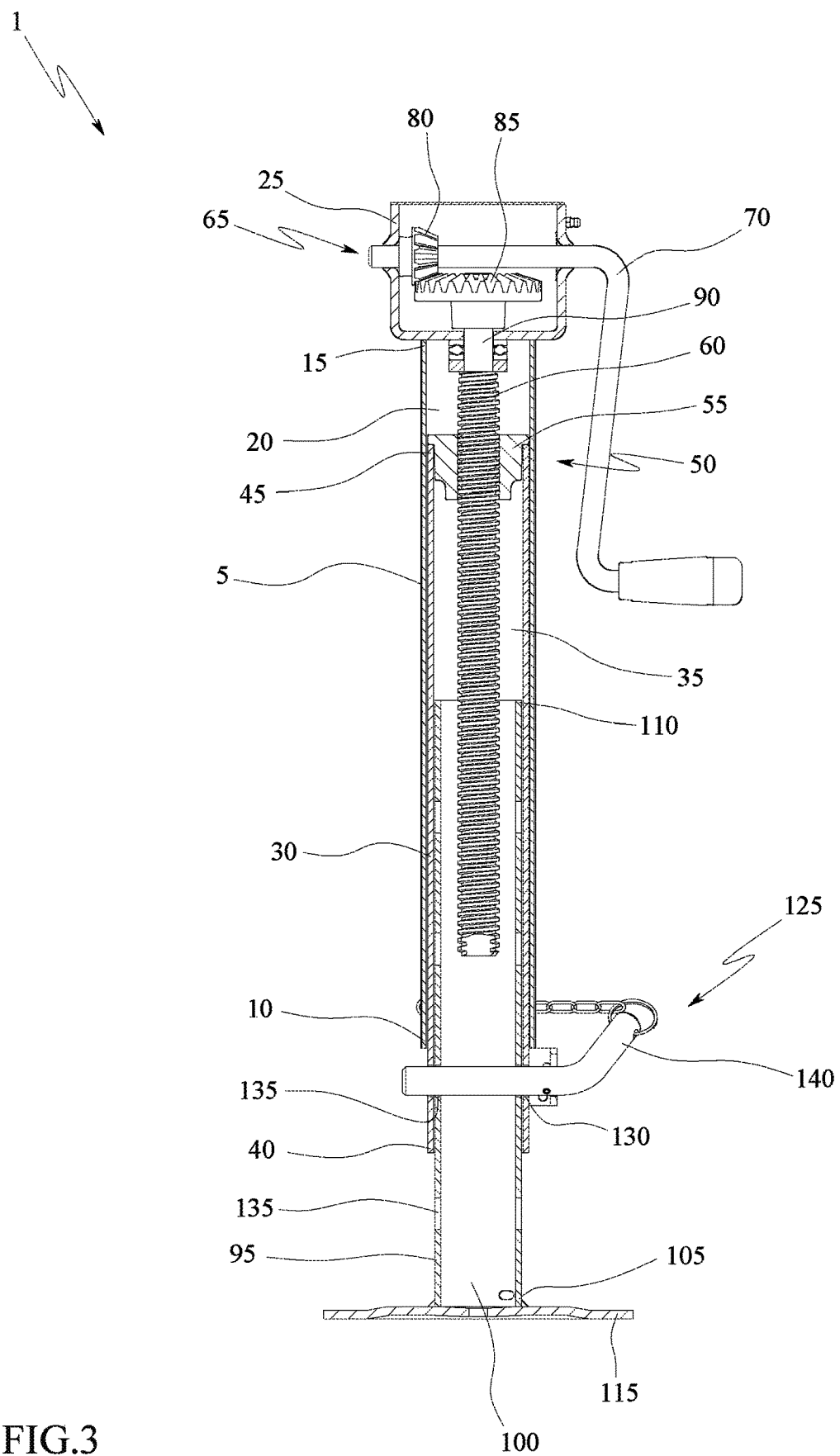
FIG. 3 is a sectional view according to the plane III-III of FIG. 2
Figure 4:
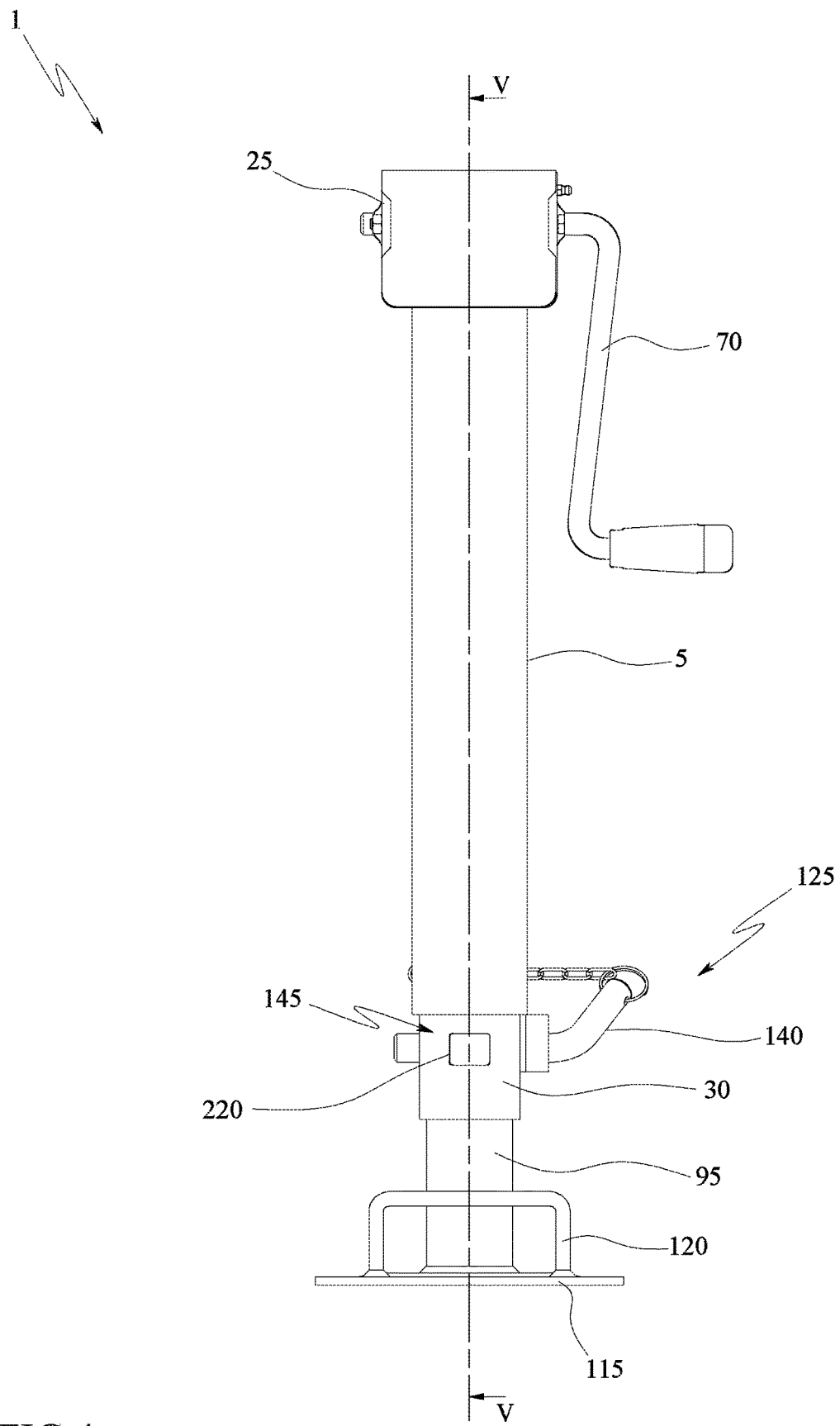
FIG. 4 is a side view of the jack rotated by 90° relative to FIG. 2.
Figure 5:
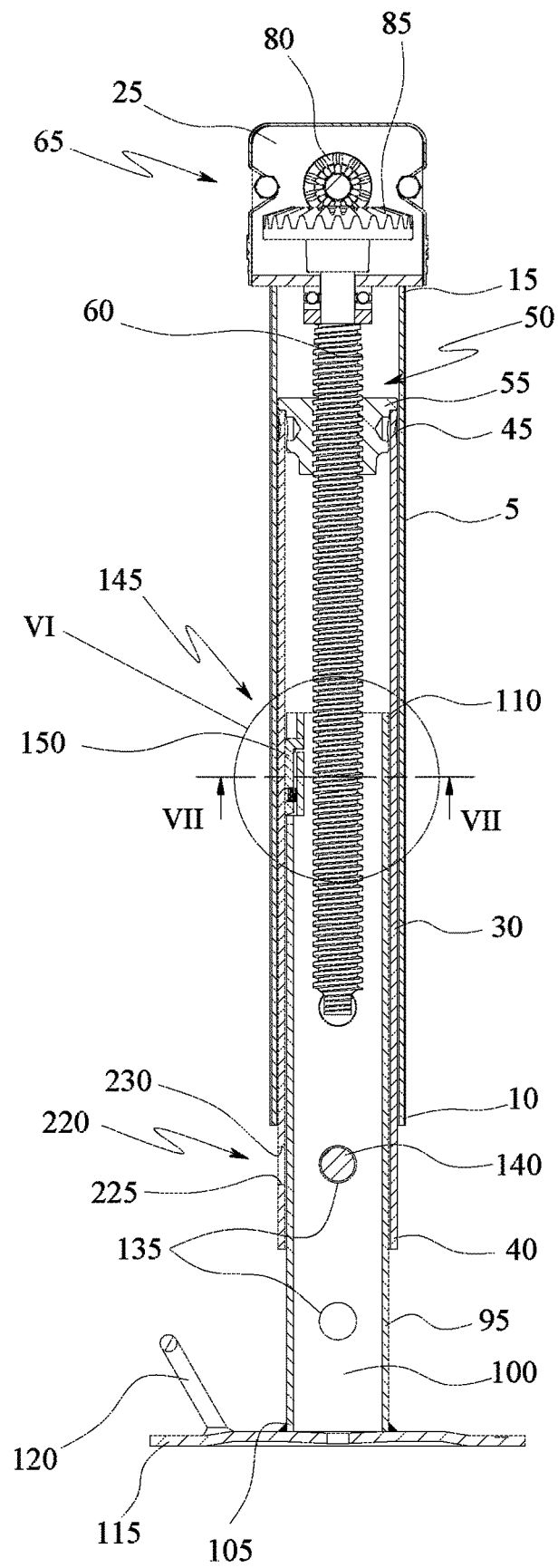
FIG. 5 is a sectional view taken along the plane V-V of FIG. 4, wherein a safety device of the jack is arranged in a first operating position.
Figure 6:
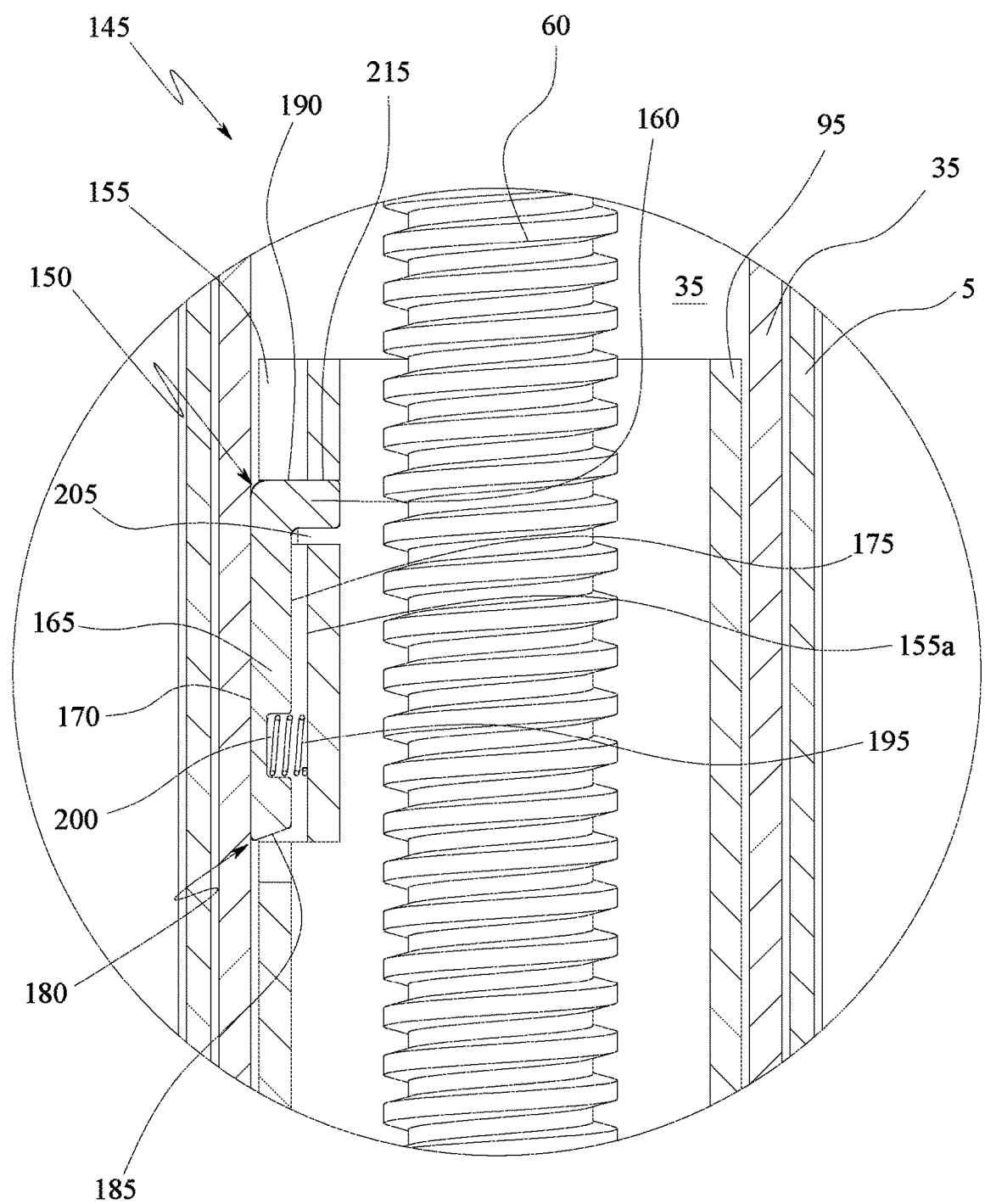
FIG. 6 is an enlarged view of a portion of FIG. 5.
Figure 7:
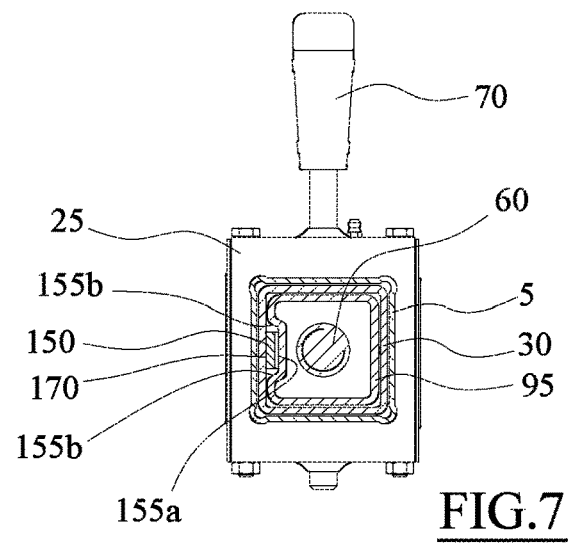
FIG. 7 is a sectional view according to the plane VII-VII of FIG. 6.
Figure 8:
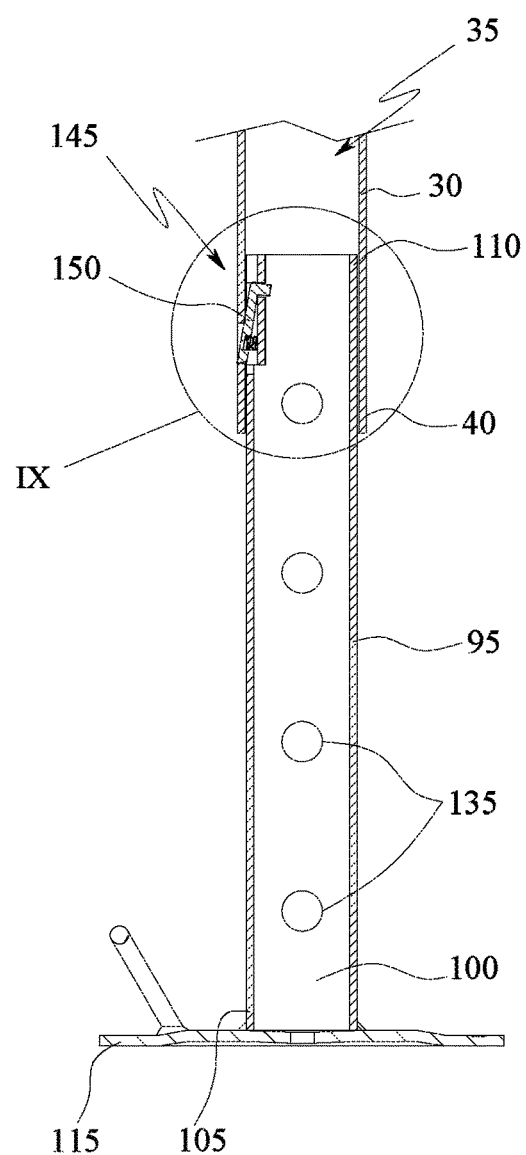
FIG. 8 is a sectional view according to the plane V-V wherein the safety device is in a second operating position.
Figure 9:
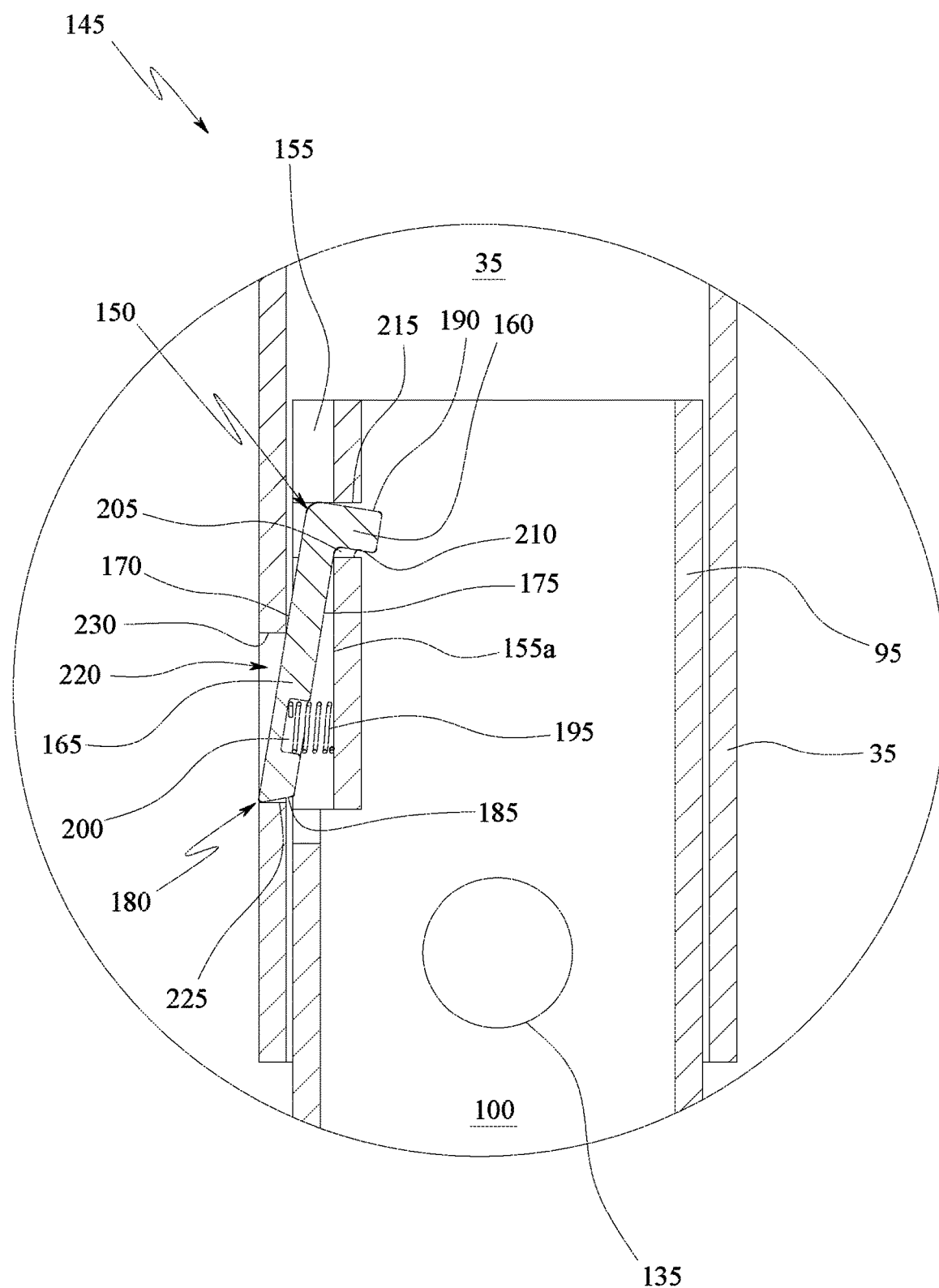
FIG. 9 is an enlarged view of a portion of FIG. 8.

With particular reference to the figures, by the numeral 1 it is generally indicated the jack for supporting and/or leveling structures, vehicles and machinery.

The jack 1 comprises a first tubular body 5, with elongated shape, which exhibits a longitudinal axis A, a first end 10 and an opposed second end 15.

The first tubular body 5 comprises an axial cavity 20.

The first tubular body 5 is secured to the object to be supported by the jack 1 by welding and/or by interposing of at least one connecting bracket (not shown in the drawings).

For example, the first tubular body 5 comprises a flange 25 through which the former is associated with the object to be supported.

The flange 25 is U-shaped and is secured by welding to the second end 15 of the first tubular body itself and is oriented with the concavity in the opposite direction relative to the first end 10.

The flange 25 is closed at the top by a cover.

The jack 1 comprises a second tubular body 30 slidably associated with the first tubular body 5 according to the longitudinal axis A, for example partially contained in the axial cavity 20 of the first tubular body 5 with reduced clearance.

The second tubular body 30 is slidably movable relative to the first tubular body 5 between a first position, wherein the distance between the second tubular body and the second end 15 of the first tubular body 5 is minimum, and a second position, wherein the distance between the second tubular body 30 and the second end 15 of the first tubular body 5 is maximum.

The second tubular body 30 exhibits an axial cavity 35, for example which is entirely crossing through the second tubular body 30.

Further, the second tubular body 30 exhibits a cross-section corresponding to the cross-section of the first tubular body 5, for example of a cylindrical or square shape or of any other suitable shape.

For example, the axial cavity 20 of the first tubular body 5 is so shaped as to accommodate an outer surface of the second tubular body 30 with reduced clearance.

The second tubular body 30 is elongated in shape with a longitudinal axis parallel to the longitudinal axis A and exhibits a first end 40 distal from the second end 15 of the first tubular body 5 and a second end 45 proximal to the second end 15 of the first tubular body 5.

The jack 1 comprises an adjusting device 50 of the distance between the second tubular body 30 and the second end 15 of the first tubular body 5, for example being so configured as to move the second tubular body 30 between a first position, wherein the distance between the second tubular body 30 and the second end 15 of the first tubular body 5 is minimum, and a second position, wherein the distance between the second tubular body 30 and the second end 15 is maximum, and in order to position it in any intermediate position between said two extreme positions.

Said adjusting device 50 comprises a nut 55 and a screw 60 which is adapted to be coupled to the nut 55.

The nut 55 is associated, for example secured, to the second tubular body 30 and exhibits a longitudinal axis parallel to the longitudinal axis A.

Preferably the nut 55 is housed in the axial cavity 35 of the second tubular body 30.

The screw 60 is rotatably associated with the first tubular body 5 relative to the longitudinal axis A.

According to an alternative embodiment the adjusting device 50 may comprise a pneumatic or hydraulic or oleo-dynamic drive.

The jack 1 is provided with actuating means 65 capable of controlling the adjusting device 50 of the distance between the second tubular body 30 and the second end 15 of the first tubular body 5.

The actuation means 65 comprises a crank 70 rotatably associated with the flange 25 and a reducer (or other gear), housed inside the U-shaped flange 25, which takes motion from the crank 70.

However it is not excluded that in alternative embodiments the reducer may be driven by an electric motor.

The reducer comprises a first conical wheel 80 solidly constrained to the crank 70 relative to a rotation axis perpendicular to the longitudinal axis A and a second conical wheel 85, rotatably associated with the first tubular body 5 relative to a rotation axis parallel to the longitudinal axis A, which engages the first conical wheel 80.

The actuation means 65 comprises a drive shaft 90, which is rotatably integral with the screw 60.

The jack 1 comprises a third tubular body 95 slidably associated with the second tubular body 30 according to the longitudinal axis A.

For example the third tubular body 95 is slidably movable between a first position, wherein the distance between the third tubular body 95 and the second end 15 of the first tubular body 5 is minimum, and a second position, wherein the distance between the third tubular body 95 and the second end 15 of the first tubular body 5 is maximum.

In addition, the third tubular body 95 exhibits a cross section corresponding to the cross section of the second tubular body 30, for example of a cylindrical shape or square shape or any other suitable shape.

For example, the third tubular body 95 is at least partially inserted into the axial cavity 35 of the second tubular body 30 with reduced clearance.

The third tubular body 95 exhibits an axial cavity 100.

The third tubular body 95 is elongated in shape with a longitudinal axis parallel to the longitudinal axis A and exhibits a first end 105 distal from the second end 15 of the first tubular body 5 and a second end 110 proximal to the second end 15 of the first tubular body 5.

The jack 1 comprises a base 115 for ground support associated with the first end 105 of the third tubular body 95.

The base 115 may for example be constituted by a flat plate having an outer (side) diameter greater than the outer (side) diameter of the third tubular body 95, lying on a plane substantially perpendicular to the longitudinal axis A.

However, it is not excluded that the base 115 may be an idle wheel rotatably associated with the first end 105 of the third tubular body 95.

The jack 1 comprises a handle 120 secured to the base 115.

The jack 1 comprises an adjusting device 125 of the distance between the third tubular body 95 and the second end 15 of the first tubular body 5, for example so configured as to prevent the third tubular body 95 from sliding relative to the second tubular body 30 at least in a first position, wherein the distance between the third tubular body 95 and the second end 15 of the first tubular body 5 is minimum, and in a second position, wherein the distance between the second end 15 of the first tubular body 5 is maximum.

Preferably the adjusting device 125 of the distance between the third tubular body 95 and the second end 15 of the first tubular body 5 is so configured as to prevent the third tubular body 95 from sliding relative to the second tubular body 30 even at least in an intermediate position between the first position and the second position.

In particular, the adjusting device 125 is operable between a disengagement position, wherein the third tubular body 95 is free to slide relative to the second tubular body 30, and an engagement position, wherein the third tubular body 95 becomes engaged relative to the second tubular body 30 at least in the first position or in the second position.

When the adjusting device 125 is in the disengagement position thereof, the third tubular body 95 may be decoupled from the second tubular body 30, that is, it may exit the axial cavity 100 of the second tubular body 30.

The adjusting device 125 of the distance between the third tubular body 95 and the second end 15 of the first tubular body 5 comprises a first through hole 130 afforded in the second tubular body 30, for example having a central axis perpendicular to the longitudinal axis A.

Preferably the first through hole 130 is afforded in close proximity to the first end 40 of the second tubular body 30.

The first through hole 130 extends diametrically from one side to the other of the second tubular body 30.

The adjusting device 125 of the distance between the third tubular body 95 and the second end 15 of the first tubular body 5 comprises a plurality of second through holes 135, for example four second through holes 135, afforded in the third tubular body 95 and aligned with one another along the direction of the longitudinal axis A.

Each second through hole 135 exhibits a central axis parallel to the central axis of the first through hole 130.

Each second through hole 135 extends diametrically from one side to the other of the third tubular body 95.

In addition, the adjusting device 125 comprises a pin 140 which is adapted to be selectively inserted through the first through hole 130 and a second through hole 135 aligned with the first through hole 130.

The pin is connected to the first tubular body 5 by a chain.

The jack 1 comprises a safety device 145 capable of preventing the whole tubular body 95 from extending completely from the second tubular body 30, i.e., of preventing the third tubular body 95 from extending completely from the axial cavity 35 of the second tubular body 30.

The safety device 145 comprises a lockbolt 150 movable between a first position, wherein it allows relative sliding between the third tubular body 95 and the second tubular body 30, and a second position, wherein it prevents the third tubular body 95 from sliding relative to the second to tubular body 30.

In particular, the lockbolt 150, when in the second position thereof, prevents relative sliding between the third tubular body 95 and the second tubular body 30 only in the direction away from the base 115 from the second tubular body 30.

The safety device 145, is further configured to automatically switch from the first position to the second position when the distance between the base 115 and the second tubular body 30 reaches a preselected value.

This preselected value is between 0.6 times and 0.9 times, preferably 0.75 times the extension of the third tubular body 95 in the direction of the longitudinal axis A.

The lockbolt 150 is interposed between the third tubular body 95 and the second tubular body 30.

For example, the lockbolt 150 is interposed between a portion of the axial cavity 35 of the second tubular body 30 and a portion of the third tubular body 95 facing the axial cavity 35.

In particular, the lockbolt 150 is housed within a recess 155 afforded in the first tubular body 5 and provided with a concavity facing the second tubular body 30, i.e. toward the axial cavity 35 of the second tubular body 30.

The recess 155 exhibits a bottom wall 155*a* facing the second tubular body 30.

The bottom wall 155*a* is flat and is lying on a plane parallel to the longitudinal axis A.

The recess 155 comprises a pair of side walls 155*b* adapted to prevent translation of the lockbolt 150 in a direction perpendicular to the longitudinal axis and parallel to the laying plane of the bottom wall 155*a*.

The side walls 155*b* being formed by the bottom wall 155*a*, are facing each other and exhibit longitudinal axes parallel to the longitudinal axis A.

The recess 155 is obtained in proximity to the second end 110 of the third tubular body 95.

The lockbolt 150 comprises an L-shaped body, i.e., it exhibits a first rectilinear section 160 and a second rectilinear section 165 having an incident longitudinal axis, for example perpendicular, to a longitudinal axis of the first section 160.

When the lockbolt 150 is in the first position, the longitudinal axis of the first section 160 is substantially parallel to the longitudinal axis A.

The second section 165 exhibits a length (in the direction of the respective longitudinal axis) greater than the length of the first section 160.

The lockbolt 150 comprises a first interface surface 170 capable of contacting the second tubular body 30.

The first interface surface 170 is flat, preferably obtained in the second section 165 of the lockbolt 150 and lying on a plane parallel to the longitudinal axis of the second section itself, for example even perpendicular to the longitudinal axis of the first section 160.

The first interface surface 170 extends along the entire length of the second section 165 in the direction of the longitudinal axis of the second section itself.

The lockbolt 150 comprises a second interface surface 175 obtained in the second section 165 of the lockbolt 150 and lying on a plane parallel to the first interface surface 170.

The distance between the first interface surface 170 and the second interface surface 175 defines the thickness per second section 165.

The lockbolt 150 comprises a beveled end 180 arranged at the end of the second section 165 opposed to the first section 160.

The beveled end 180 comprises a first abutting surface 185 lying on a plane inclined relative to the longitudinal axis of the second section 165 and relative to the longitudinal axis of the first section 160.

In practice, the first abutting surface 185 defines a beveling of the beveled end 180.

The first abutting surface 185 is lying on a plane inclined relative to a plane perpendicular to the laying plane of the first interface surface 170 and distinct from the laying plane of the first interface surface 170.

For example, the angle facing the second interface surface 175 and formed by the intersection of the laying plane of the first abutting surface 185 with the laying plane of the first interface surface 170, is an acute angle.

The first abutting surface 185 extends (in a perpendicular direction to the longitudinal axis of the second section 165) from the first interface surface 170 to the second opposed interface surface 175.

The lockbolt 150 comprises a second abutting surface 190 obtained in the first section 160, for example perpendicular and contiguous to the first interface surface 170.

The safety device 145 comprises a first slot 205 wherein at least one portion of the first section 160 of the lockbolt 150 is inserted.

In particular, the first section 160 is firmly associated with the first slot 205. The first slot 205 exhibits a central axis incident to the longitudinal axis A, for example perpendicular thereto.

The first slot 205 is afforded close to the second end 110 of the third tubular body 95.

For example, the first slot 205 is afforded in the bottom wall 155*a* of the recess 155.

The first slot 205 comprises a first surface 210 facing the second end 110 of the third tubular body 95.

The first surface 210 of the first slot 205 is flat, preferably lying on a plane perpendicular to the longitudinal axis A.

The first slot 205 comprises a second surface 215 facing the first end 105 of the third tubular body 95.

The second surface 215 of the first slot 205 is flat, preferably lying on a plane perpendicular to the longitudinal axis A.

The safety device 145 comprises a second slot 220 afforded in the second tubular body 30, for example of the through type, i.e. which is passing through the second tubular body 30 from the axial cavity 35 to an outer surface of the second tubular body itself.

The second slot 220 is afforded in proximity of the first end 40 of the second tubular body 30.

The second slot 220 comprises a first surface 225 facing the second end 45 of the second tubular body 30.

The first surface 225 of the slot is flat, preferably lying on a plane perpendicular to the longitudinal axis A.

The second slot 220 comprises a second surface 230 facing the first end 40 of the second tubular body 30.

The second slot surface 230 is flat, preferably lying on a plane perpendicular to the longitudinal axis A.

In an alternative embodiment, the second surface 230 is lying on a plane inclined relative to a plane perpendicular to the longitudinal axis A.

The second slot 220 exhibits a central axis perpendicular to the longitudinal axis A, for example also perpendicular to a central axis of the first through hole 130 of the adjusting device 125.

The first surface 225 of the second slot 220 and the second surface 215 of the first slot 205 are facing each other when the safety device 145 is in the second position.

Figure 10:
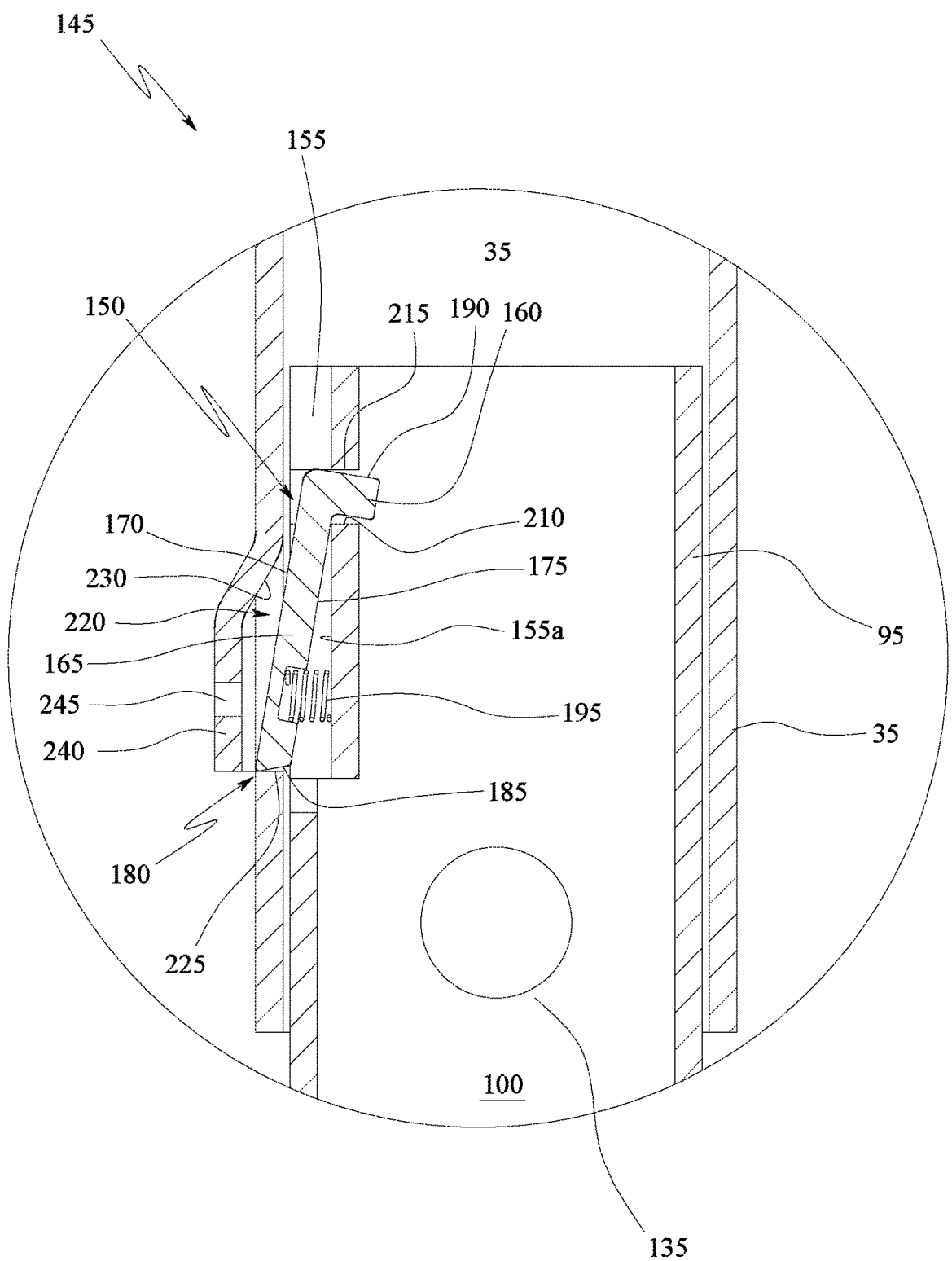
FIG. 10 is an enlarged view of another embodiment of the safety device, when it is in the second operating position.

In an alternative embodiment shown in FIG. 10, the safety device 145 comprises a wall 240 solidly constrained to the second tubular body 30 and capable of occluding at least partially the slot 220 so as to prevent the entry of foreign bodies into the axial cavity 35 of the second tubular body 30.

The wall 240 comprises a through hole 245 passing therethrough, which is suitable for allowing manual release of the safety device 145.

That is, the through hole 245 puts in communication the outside environment to the second tubular body 30 via the second slot 220.

The through hole 245 exhibits a central axis substantially parallel to the central axis of the second slot 220, e.g. perpendicular to the longitudinal axis A.

In the embodiment illustrated in FIG. 10, the second surface 230 of the second slot 220 is defined by a portion of a face of the wall 240 facing the axial cavity 35.

In this embodiment, the second surface 230 is inclined relative to the central axis of the second slot 220, i.e. it is inclined relative to a plane perpendicular to the longitudinal axis A.

In practice, in this embodiment, the wall 240 and the second slot 220 are formed with a convexity being obtained in a wall of the second tubular body 30, outwards i.e. in the direction opposite to the axial cavity 35.

This convexity occurs with a cut being obtained, for example by laser cutting, which is crossing through a portion, i.e. a wall, according to an axis perpendicular to the longitudinal axis of the second tubular body 30.

The safety device 145 comprises an elastic member 195 provided with a first end which is in contact with the third tubular body 95, for example with the bottom wall 155*a* of the recess 155, and an opposite second end that is in contact with the lockbolt 150, for example in contact with an end portion of the second section 165 being distal from the first section 160.

In particular, the second end is accommodated within a valley 200 afforded in the second interface wall 175.

The valley 200 is adapted to accommodate the second end of the elastic member 195 with a reduced clearance.

In the illustrated embodiment, the valley 200 is a blind cylindrical hole.

The elastic member 195 is for example a compression helical spring.

For example the valley 200 is capable of accommodating at least one coil of the helical torsion spring.

The elastic member 195 is configured to retain at least one portion of the lockbolt 150, such as the first interface surface 170, in contact with the second tubular body 30, i.e. with a portion of the axial cavity 35 of the second tubular body 30.

In addition, the elastic member 195 is configured to rotate the lockbolt 150 between the first position and the second position with at least one portion of the second section 165 being inserted into the second slot 220 when the distance between the base 115 and the second tubular body reaches the preselected value.

For example, when the lockbolt 150 is in the second position, the first interface surface 170 is at least partially inserted in the second slot 220 and comes in contact with the second slot 220 at least at one point, preferably with the second surface 230 of the second slot 220.

That is, the first interface surface comes in contact with an edge of the second surface 230 defined by the intersection of the slot 220 with an inner surface of the axial cavity 35.

When the lockbolt 150 is in the second position the lying plane of the interface surface 170 is inclined relative to a plane perpendicular to the longitudinal axis A.

That is, when the lockbolt 150 is in the second position the interface surface 170 intersects the central axis of the second slot 220.

When the lockbolt 150 is in the first position the lying plane of the first interface surface 170 is substantially parallel to the longitudinal axis A.

In addition, when the elastic member 195 causes the lockbolt 150 to rotate from the first position to the second position thereof, the first abutting surface 185 comes in contact with the second slot 220, at least at one point for example with the first surface 225, and the second abutting surface 190 comes in contact with the first slot 205 at least at one point, for example with the second surface 230 of the first slot 205.

When the lockbolt 150 is in the first position the first abutting surface 185 is facing the third tubular body 95.

When the lockbolt 150 is in the second position the first abutting surface 185 is at least partially inserted in the second slot 220 and comes in contact with the second slot 220 at least at one point, preferably with the first surface 225 of the second slot 220.

That is, an edge of the first abutting surface 185 defined by the intersection with the first interface surface 170 comes in contact with the first surface 225 of the second slot 220 at least at one point, preferably along a straight line.

When the lockbolt 150 is in the first position, the second abutting surface 190 comes in contact with the first slot 205 at least at one point, preferably with the second surface 215 of the first slot 205.

That is, the second abutting surface 190 comes in contact with an edge of the first surface 225 defined by the intersection of the first slot 205 with the bottom wall 155*a* of the recess 155.

The operation of the actuator 10 according to the invention is as follows.

During normal operation, the safety device 145 remains in the first position, i.e. the elastic member 195 maintains the first interface surface 170 in contact with the surface of the axial cavity 35 of the second tubular body 30.

When the adjusting device 125 of the distance between the third tubular body 95 and the second end 45 of the second tubular body 30 comes to be in the disengagement position thereof, mutual sliding between the first tubular body 5 and the second tubular body 30 is free.

Under this condition, when the sliding occurring in the away direction along the longitudinal axis A between the third tubular body 95 and the second tubular body 30 brings the lockbolt 150 at the second slot 220 the safety device 145 switches from the first position to the second position.

That is, the elastic member 195 causes the lockbolt 150 to rotate by pivoting through the first section 160 of the lockbolt 150, which is permanently inserted in the first slot 205, and by inserting at least one portion of the second section 165 within the second slot 220.

When the second section 165 is at least partially inserted in the second slot 220, the first interface surface 170 slides on the edge of the second slot 220 defined by the intersection of the second surface 230 with the axial cavity 35.

If, after insertion of the second section 165 into the second slot 220, the third tubular body 95 and the second tubular body 30 continue being away from one another, the first abutting surface 185, i.e. the edge between the first abutting surface 185 and the first interface surface 170, abuts against the first surface 225 of the second slot 220, and since the second abutting surface 190 is in contact with the second surface 215 of the first slot 205, which is facing the first surface 225 of the second slot 220 when the safety device 145 is in the second position, the lockbolt 150 impedes the sliding of the third tubular body 95 in the direction away of the second tubular body 30.

In order that the safety device 145 becomes disengaged, i.e. returned to the first position, it is sufficient for the operator to push the third tubular body 95 towards the second tubular body 30 for example by gripping the handle 25.

When the third tubular body 95 is pushed toward the second tubular body 30, the lockbolt 150, having the first section 160 inserted in the first slot 205, is moved along the longitudinal axis A to the second end 45 of the second tubular body 30. During this translation, the first interface surface 170, being inclined relative to the second slot 220, is free to slide without applying resistance to the edge of the second slot 220 defined by the intersection of the second surface 230 with the axial cavity 35, or where the embodiment of FIG. 10 applies, directly against the second surface 230, until the lockbolt 150 disengages the second slot 220 and is fully received into the recess 155.

In addition, the safety device 145 may be disengaged, such that complete extraction of the third tubular body 95 from the second tubular body 30 is allowed, for example for maintenance purposes.

This is done by manually pushing the second section 165 of the lockbolt 150 thus overcoming the force of the elastic member 195, such that the lockbolt 150 is switched from the second position to the first position.

Where the embodiment of FIG. 10 applies, the operation is accomplished by inserting a body through the second slot 220, and through the through hole 245 of the wall 240 such that the second section 165 of the lockbolt 150 is pushed.

Then, while holding down the second section 165 the third tubular body 95 becomes completely extracted from the second tubular body 30.

The invention thus conceived is susceptible of numerous modifications and variants all within the scope of the inventive concept.

In addition all details may be replaced by other technically equivalent elements.

In practice all the materials used, as well as the contingent shapes and size, may be any according to the requirements while not departing from the scope of protection of the following claims.

The invention claimed is:

1. A jack which is extensible comprising:
a first tubular body,
a second tubular body slidably associated with the first tubular body and movable along a predetermined longitudinal direction,
a third tubular body slidably associated with the second tubular body and movable along the longitudinal direction,
a base for support associated with an end of the third tubular body distal from the second tubular body,
a safety device which is automated, comprising a lockbolt movable between a first position in which relative sliding between the third tubular body and the second tubular body is permitted, and a second position in which sliding of the third tubular body relative to the second tubular body is prevented, and
wherein the safety device is configured such that the lockbolt, when in the second position thereof, impedes relative sliding between the third tubular body and the second tubular body only in the direction in which the base moves away from the second tubular body.

2. The jack according to claim 1, wherein the safety device is configured to automatically switch from the first position to the second position when the distance between the base and the second tubular body reaches a preselected value.

3. The jack according to claim 1, wherein the lockbolt comprises a first section and a second section perpendicular to the first section, and wherein the safety device comprises a first slot afforded in a bottom wall of a recess of the third tubular body and with which the first section of the lockbolt is permanently associated, a second slot afforded in the second tubular body, and an elastic member capable of rotating the lockbolt between the first position and the second position with at least one portion of the second sections being inserted into the second slot when the distance between the base of support and the second tubular body reaches the preselected value.

4. The jack according to claim 3, wherein the lockbolt comprises an interface surface obtained in the second section, which interface surface, when the lockbolt is in the second position, is at least partially inserted in the second slot, comes into contact with said second slot and is lying on an inclined plane relative to a perpendicular plane to the longitudinal axis axis.

5. The jack according to claim 3, wherein the lockbolt comprises a first abutting surface capable of contacting at least at one point a surface of the second slot and a second abutting surface capable of contacting at least at one point a surface of the first slot facing the surface of the second slot, when the safety device is in the second position.

6. The jack according to claim 3, wherein the elastic member exhibits a first end in contact with the bottom wall of the recess and a second end received within a valley afforded in the lockbolt.

7. The jack according to claim 1, comprising a first adjusting device of the distance between the second tubular body and the first tubular body, said first adjusting device being provided with a nut solidly constrained to the second tubular body and a screw rotatably associated with the first tubular body according to a rotation axis and configured to be screwed or unscrewed relative to said nut.

8. The jack according to claim 1, comprising a second adjusting device of the distance between the third tubular body and the second tubular body, said second adjusting device being provided with a hole defined in the third tubular body, a hole defined in the second tubular body and a pin (140) adapted to be inserted through the hole of the second tubular body and the hole of the third tubular body when said hole of the second tubular body and said hole of the third tubular body are aligned.

9. The jack according to claim 1, wherein the base of support comprises a handle.

10. A jack which is extensible comprising:
a first tubular body,
a second tubular body slidably associated with the first tubular body and movable along a predetermined longitudinal direction,
a third tubular body slidably associated with the second tubular body and movable along the longitudinal direction,
a base for support associated with an end of the third tubular body distal from the second tubular body,
a safety device which is automated, comprising a lockbolt movable between a first position in which relative sliding between the third tubular body and the second tubular body is permitted, and a second position in which sliding of the third tubular body relative to the second tubular body is prevented,
wherein the lockbolt comprises a first section and a second section perpendicular to the first section, and wherein the safety device comprises a first slot afforded in a bottom wall of a recess of the third tubular body and with which the first section of the lockbolt is permanently associated, a second slot afforded in the second tubular body, and an elastic member capable of rotating the lockbolt between the first position and the second position with at least one portion of the second section being inserted into the second slot when the distance between the base of support and the second tubular body reaches the preselected value.

11. A jack which is extensible comprising:
a first tubular body,
a second tubular body slidably associated with the first tubular body and movable along a predetermined longitudinal direction,
a third tubular body slidably associated with the second tubular body and movable along the longitudinal direction,
a base for support associated with an end of the third tubular body distal from the second tubular body,
a safety device which is automated, comprising a lockbolt movable between a first position in which relative sliding between the third tubular body and the second tubular body is permitted, and a second position in which sliding of the third tubular body relative to the second tubular body is prevented, and
a second adjusting device of the distance between the third tubular body and the second tubular body, said second adjusting device being provided with a hole defined in the third tubular body, a hole defined in the second tubular body and a pin (140) adapted to be inserted through the hole of the second tubular body and the hole of the third tubular body when said hole of the second tubular body and said hole of the third tubular body are aligned.

* * * * *